2,723,614

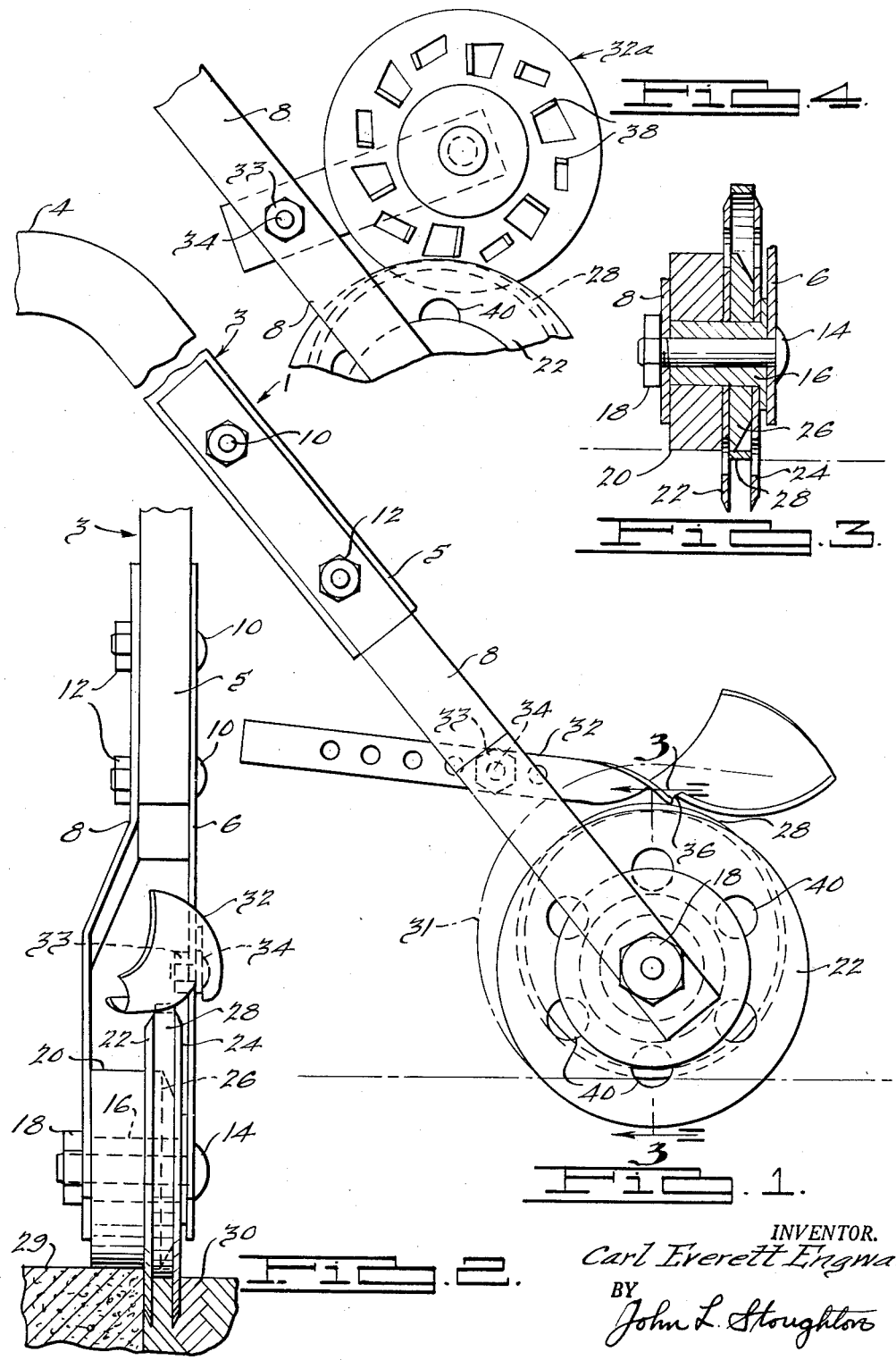

LAWN EDGING TOOL

Carl Everett Engwall, Detroit, Mich.

Application June 16, 1954, Serial No. 437,118

9 Claims. (Cl. 97—227)

This invention relates to earthworking tools and is particularly adapted, among other uses, as an edging tool for trimming the intersection of a lawn with a structure such as a walk, driveway, curbing or the like.

In lawn edging it is desirable to cut away a portion of the turf adjacent the sidewalk, curb, driveway, etc., and to leave a narrow space which is somewhat depressed to border the grass plot. Devices for performing this result and utilizing two spaced parallel cutting disks are shown in issued patents as for example, Wolf Patent No. 1,861,104. In practice it has been found that the cut turf and dirt tend to remain in the annular space between the parallel cutting disks and if it is allowed to remain in this space, the tool thereafter is not effective to cut and remove further turf and dirt until the annular space is cleaned. Wolf was confronted with this problem and in an endeavor to solve the same a scraper tool 28 is provided. The scraper is easily bent and, if made with the suitable clearances, then tends to bind, and this reason, as well as others, makes it unsatisfactory.

It is therefore a primary object of this invention to provide an improved edging tool of the character described.

Another object of this invention is to provide a lawn edging tool which is exceedingly simple in its construction, thoroughly efficient and reliable in operation, inexpensive to manufacture, light and durable in structure, and otherwise well adapted for the purpose for which it is designed.

Another object of this invention is to provide, in such a tool, improved means for removing the cut earth and grass from the tool as it is being pushed along in the edging operation.

A further and more specific object is to provide a free floating ring between the spaced cutting disks by which the cut turf, dirt or other material is effectively ejected from between the cutting disks.

Other objects will be apparent from the description, the appended claims, and the drawings, in which drawings:

Figure 1 is a side elevational view of a lawn edging tool embodying the invention;

Figure 2 is a front view of the edging tool of Figure 1;

Figure 3 is a view taken substantially along the line 3—3 of Figure 1; and

Figure 4 is a partial view showing a portion of the lawn edging tool of Figure 1 but with a modified form of the unloading tool.

Referring to the drawings by characters of reference, the numeral 1 designates generally a lawn edging tool having a handle 3, having an upper end or portion 4 suitable for grasping by the operator, and having a lower end portion 5. A pair of strap members 6 and 8 are clamped to opposite sides of the end portion 5 by means of the nuts and bolts 10 and 12 and extend outwardly therefrom. The outwardly extending end portions of the strap members 6 and 8 are apertured adjacent their extending free end portions and a bolt 14 extends therethrough. A shouldered bearing member 16 surrounds the bolt 14 and spaces the strap members 6 and 8 when the nut 18 is tightened. A guide member 20 and a pair of circular disk cutting blades 22 and 24, separated from each other by a spacer member 26, are rotatably mounted on the bearing member 16. A free floating ring 28 is positioned between the cutting disks 22 and 24 and is of such a diameter that when the inner periphery of the ring is in engagement with the outer periphery of the spacer member 26, the diametrically opposite portion of the outer periphery of the floating ring 28 is in substantial alignment with the outer periphery of the cutting disks 22 and 24.

As shown in Figure 1, the guide portion 20 is adapted to ride along the top surface of the sidewalk or other structure 29 adjacent the turf 30 which is being edged. The disks 22 and 24 extend downwardly therefrom into the turf 30 and as the tool is rolled along, the cutting edges of the two disks 22 and 24 cut away the adjacent portion of the turf 30. As the disks roll, the cut turf is carried upwardly and is gradually pushed out from between the disks by the action of the free floating ring 28 as illustrated by the dot dash line 31. In most instances by the time that the cut away turf has reached the top of the wheel it will have already fallen away. However, in the event that such action has not occurred, an unloading tool 32 or 32a which is secured by a nut 33 and bolt 34 to the strap 6 intermediate the axle shaft 14 and the lower end portion 5 of the handle cuts or removes the material. The tool 32 may have a fixed scraping edge 36 while the tool 32a may be a rotatably secured sheet metal disk with bent out fingers 38 which extend across the space between the disks 22 and 24 as shown.

It will be noted that the outer periphery of the spacer member 26 is tapered in longitudinal section and disks 22 and 24, adjacent the outer periphery of the spacer 26, are provided with a plurality of apertures 40 so that if any soil or other substance finds its way behind the floating ring 28 it will be expelled from the space between the cutting disks 22 and 24 as the ring is pushed upwards against the outer surface of the spacer 26.

It is thought that the construction, operation, utility, and advantages of this invention will now be apparent to those skilled in the art without a more detailed description thereof. It will be apparent that changes in the details of construction and in the combination and arrangement of parts may be resorted to without departing from the spirit or scope of the invention which is determined by the hereinafter appended claims.

What is claimed and is desired to be secured by United States Letters Patent is as follows:

1. A device of the character described comprising, a pair of substantially parallelly spaced rotatable cutting members, a spacer element between said members, and a floating ring surrounding said element and intermediate said members, said ring having an internal diameter substantially greater than the outer diameter of said element whereby, said ring may assume an eccentric position relative to said members.

2. A device of the character described comprising, a supporting structure, a pair of disk-like members rotatably supported on said structure, a spacer element between said members, and a floating ring surrounding said element intermediate said members, said ring having an internal diameter substantially greater than the outer diameter of said element whereby, said ring may assume an eccentric position relative to said members.

3. A tool of the character described comprising a pair of substantially circular cutting members, means for rotatably supporting said members including a spacing element for holding said cutting members in substantially parallel fixed spaced relation, said means having a portion intermediate said members of substantially circular periphery, said periphery being of lesser diameter than the periphery of said cutting members, a floating ring encircling said intermediate portion and having an internal diameter substantially greater than the peripheral diameter of said intermediate portion and having an external diameter substantially less than the peripheral diameter of said cutting members.

4. The combination of claim 3 in which the outer periphery of said intermediate portion is tapered in longitudinal cross section and in which the wall of at least one of said cutting members is perforate adjacent the outer periphery of said intermediate portion.

5. The combination of claim 3 in which means is provided outwardly of the outer periphery of said cutting members to remove the material expelled from the space between said cutting members.

6. The combination of claim 5 in which said removing means comprises a member having a scraping edge positioned closely adjacent the outer periphery of said cutting members and extending thereacross.

7. The combination of claim 5 in which said removing means comprises a wheel-like device having teeth which overlie the space between said cutting members.

8. A lawn edging tool comprising an elongated shaft-like element having a hand grasping portion and having a supporting portion, a pair of substantially parallel disk-like cutting members, means rotatably supporting said cutting members and carried by said element supporting portion, said means including a portion for holding said cutting members in fixed relative position, and having a portion intermediate said cutting members, said cutting members being of substantially larger diameter than said intermediate portion whereby an annular space is provided therebetween, a floating ring positioned in said annular space, said ring having an internal diameter substantially greater than the peripheral diameter of said intermediate portion and an external diameter substantially less than the peripheral diameter of said cutting members, a depth determining guide member carried by said supporting portion and adapted to engage a surface to determine the depth that said cutting members may extend into the medium being worked upon, said ring being so dimensioned with respect to said cutting members that, when a portion of said ring is against said means portion, a second portion of the circumference of said ring is in substantial alignment with a portion of the circumference of at least one of said cutting members.

9. A lawn edging tool comprising an operating handle, a pair of parallelly spaced rotatable turf cutting blades rotatably mounted on an end portion of said handle, spacing means located between and holding said cutting blades in fixed relative spaced position and being of substantially lesser diameter than said blades to provide an annular space, a floating ring positioned in said annular space, said ring having an internal diameter substantially greater than the peripheral diameter of said spacing means and an external diameter substantially less than the peripheral diameter of said blades, a cylindrical depth determining guide member concentrically arranged with respect to said blades and adapted to engage a surface to determine the depth that said blades may extend into the turf being worked upon.

References Cited in the file of this patent

UNITED STATES PATENTS

| | | |
|---|---|---|
| 1,861,104 | Wolf | May 31, 1932 |
| 2,212,057 | Waller | Aug. 20, 1940 |